United States Patent [19]

Dettfurth et al.

[11] Patent Number: 4,509,308
[45] Date of Patent: Apr. 9, 1985

[54] MOUNTING ASSEMBLY AND METHOD FOR INSTALLING DOWELS IN COMPOUND PANELS

[75] Inventors: Karl Dettfurth; Bernd Dettfurth, both of Hamburg, Fed. Rep. of Germany

[73] Assignee: Messerschmitt-Boelkow-Blohm GmbH, Munich, Fed. Rep. of Germany

[21] Appl. No.: 479,571

[22] Filed: Mar. 28, 1983

[30] Foreign Application Priority Data

Apr. 8, 1982 [DE] Fed. Rep. of Germany ....... 3213213

[51] Int. Cl.³ .............................................. E04C 2/54
[52] U.S. Cl. .......................................... 52/787; 52/704
[58] Field of Search ........................ 52/787, 704, 741

[56] References Cited

U.S. PATENT DOCUMENTS 4,341,053  7/1982  Dettfurth et al. ..................... 52/787

FOREIGN PATENT DOCUMENTS 1109457  6/1961  Fed. Rep. of Germany ........ 52/787
1500949  9/1970  Fed. Rep. of Germany .
2813098  10/1979  Fed. Rep. of Germany ........ 52/787
2835275  2/1980  Fed. Rep. of Germany ........ 52/787

Primary Examiner—Carl D. Friedman
Assistant Examiner—Naoko Nakazawa Slack
Attorney, Agent, or Firm—W. G. Fasse; D. H. Kane

[57] ABSTRACT

A mounting assembly facilitates the installation of dowels in layered compound panels. A dowel is held in its installed position in a hole in the panel by anchoring elements including at least one flange and by casting a curable casting resin mass around the dowel. The upper facing surface of the dowel inserted in the hole in the panel and the lower surface of a mounting member for facilitating the installation of the dowel are both located in a plane in common with an outer layer of the panel. The mounting member extends outside the circumference of the dowel and is connected to the dowel body (2, 41) thereby forming a casting dish or ring (21, 59) around the dowel. The dowel body (2, 41) has a cornered portion (6, 45) located centrally around the axis of a threading in a threaded bushing, whereby the flange (5, 43) merges into the cornered portion and whereby the cornered portion has flattened corners (15) defining an outer circle having a diameter equal to or larger than the diameter of the flange. The threaded bushing (3, 42) inserted into the dowel body (2, 41) has its own flange (8, 46) which reaches into the flange (5, 43) of the dowel body.

9 Claims, 8 Drawing Figures

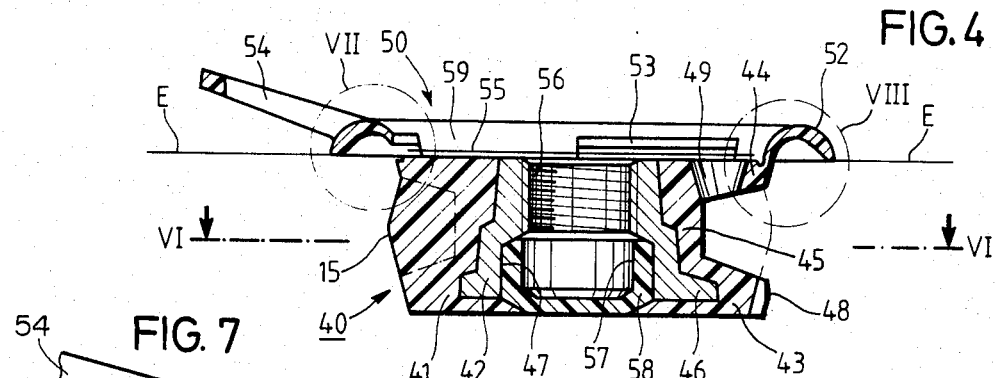
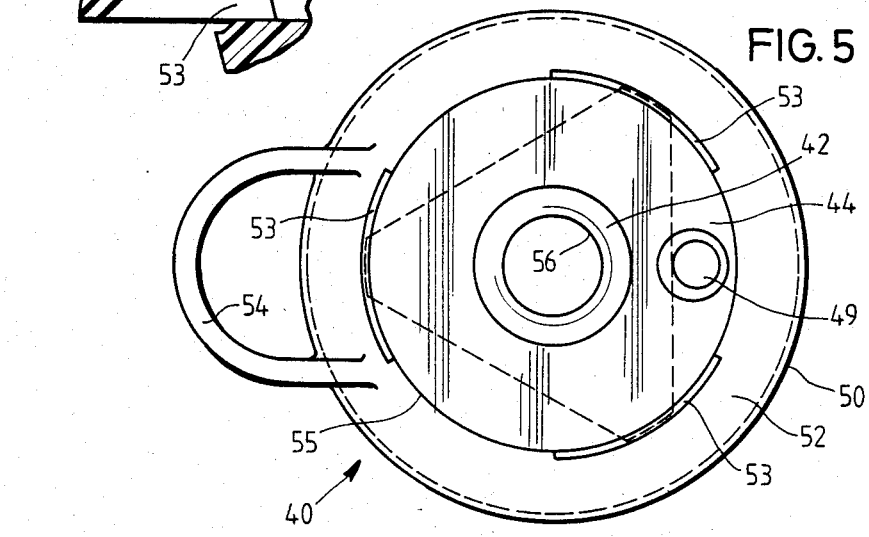
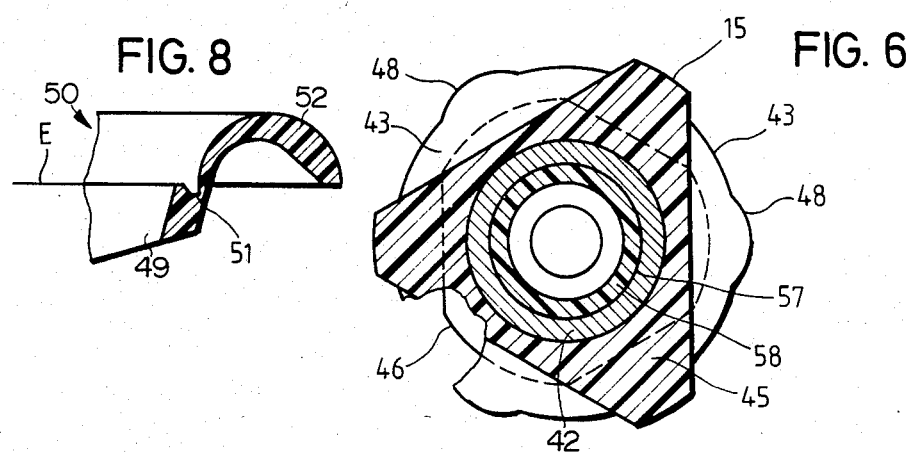

MOUNTING ASSEMBLY AND METHOD FOR INSTALLING DOWELS IN COMPOUND PANELS

CROSS-REFERENCE TO RELATED APPLICATION

The present invention relates to U.S. Ser. No.: 128,558, filed on Mar. 10, 1980, title: Built-In Connector Element For Sandwich Type Compound Panels; now U.S. Pat. No. 4,341,053, granted on July 27, 1982 to Karl Dettfurth et al.

BACKGROUND OF THE INVENTION

The invention relates to a mounting assembly and method for installing dowels in compound panels such as layered compound panels especially sandwich panels having a honeycombed core between two cover layers. Such mounting assembly includes a threading for holding connecting elements. The dowel is anchored in its installed position with the aid of a pourable and curable resin mass. For this purpose the dowel is provided with anchoring elements having at least one flange. The panel is provided with a bore into which the dowel is inserted, whereby the upper facing surface of the dowel extends flush with one surface of the panel. A mounting member which aids in the installation of the dowel has a lower surface extending in the same surface or plane of the panel in which the upper facing surface of the dowel extends. Further, the mounting member has a circumference which extends radially outside the dowel and above the panel.

German Pat. No. 1,500,949 discloses a mounting assembly as just described. Such prior art mounting assembly comprises the dowel B and a bridging member A. The bridging member is provided with an adhesive foil or tape and with a covering. For installing the prior art structure the worker must first remove the covering from the adhesive tape, whereupon he may place the bridging member on top of the dowel. This procedure is difficult and therefore requires special mounting jigs. Further, the prior art dowel has two flanges which results in a dowel shape difficult to manufacture and just as difficult to install.

As a result of the two flanges the prior art dowel can be produced substantially only as a turned element requiring a lathe operation. Additionally, the actual installing is difficult because only a small hole is provided for the pouring of the casting resin through the narrow upper flange. Such a small hole and the narrow upper flange make it difficult to achieve a rapid casting. Additionally, it is difficult to make sure that the space surrounding the dowel is completely filled with the casting resin.

Another disadvantage of the prior art dowel is seen in that due to its shape it may be manufactured substantially only of metal and the form locking connection between the metal and the casting resin is not especially strong. Thus, it is possible that the dowel gets loose from the casting resin, whereby its function as a connecting element is not assured. Further, the prior art bridge has the disadvantage that any casting resin flowing back out of the venting hole may flow over the bridge and onto the surface of the compound layer panel which, as a result, needs to be cleaned which is an unnecessary and costly operation.

OBJECTS OF THE INVENTION

In view of the above it is the aim of the invention to achieve the following objects singly or in combination:

to provide a mounting assembly and method for installing dowels in compound panels which avoids the above difficulties of the prior art;

to construct the mounting assembly in such a manner that the resulting dowel anchoring has improved manufacturing characteristics as well as improved functional characteristics such as an improved holding power once the dowel is installed in a panel;

to provide a dowel anchoring which guarantees a long functional life even under dynamic load conditions; and to avoid the soiling of the panel surface adjacent to dowel installation points.

SUMMARY OF THE INVENTION

According to the invention a mounting member is secured to the dowel body and forms a pouring dish for the castable resin mass around the dowel. The dowel body itself is provided with a cornered portion or member located centrally around the central threaded axis of the structure, whereby the flange merges into the cornered member or portion and whereby the latter is provided with flattened corners defining an outer circumferential circle having a diameter equal to or larger than the diameter of the dowel flange. A threaded bushing is inserted into the dowel body. This bushing is provided with its own flange which reaches into the flange of the dowel body.

According to the invention a dowel as disclosed herein is installed with the following sequence of steps. A protective masking, such as a self-adhesive tape, is applied to one surface of a panel. The protective masking has at least one edge which is not adhesive. Then a hole is drilled into the panel having a diameter somewhat smaller than the diameter of the cylindrical envelope surface of the projections of the dowel body. The depth of the bore is made deeper than the length of the dowel body. Thereafter, the mounting assembly, including the mounting dish, is inserted into the drilled hole, whereby a press-fit is achieved due to the fact that the projections have a slightly larger diameter than the diameter of the bore. Thereafter, the castable resin is filled through a hole in the dish, whereby air is vented through a ring channel and a larger opening in the dish. Any excess of casting resin coming out of the venting is captured in the dish. Thereafter, the casting resin is cured and the mounting member or dish is pulled off, for example, with a hooked tool. Thereafter, the protective foil is removed by pulling it off with the aid of its non-adhesive edge.

The invention has, among others, the following advantages. The dowel and the mounting member in the form of a casting ring or dish are constructed as a unit which may be preferably manufactured of synthetic material suitable for injection or pressure casting. Only the threaded bushing needs to be made of high quality steel. The shape of the dowel makes it possible to provide a sufficiently large fill-in hole and a sufficiently large venting hole or holes. The casting dish performs three functions. It greatly facilitates the pouring in the manner of a funnel and it also defines the proper position of the dowel in the panel because the edge of the casting dish rests on the surface of the panel. Additionally, the casting dish captures any excess casting resin. Yet another advantage of the present mounting assembly is seen in that each of its components may be made of the material especially suitable for the particular purpose. Thus, the threaded bushing may be made of high alloy steel, whereas the dowel body and the casting dish may be made of other suitable materials such as synthetic materials. The outer surface of the dowel body may be roughened to achieve a more intimate bonding between the casting resin and the synthetic material dowel body, whereby a highly durable strength of the structure is achieved, even under dynamic load conditions.

BRIEF FIGURE DESCRIPTION

In order that the invention may be clearly understood, it will now be described, by way of example, with reference to the accompanying drawings, wherein:

FIG. 4 is a sectional view similar to that of FIG. 1, but showing another embodiment of the present invention;

FIG. 5 is a top plan view of the structure shown in FIG. 4;

FIG. 6 is a sectional view along section line VI—VI in FIG. 4;

FIG. 7 is a sectional view on an enlarged scale illustrating the portion VII in FIG. 4; and FIG. 8 is a sectional view on an enlarged scale illustrating the portion VIII in FIG. 4.

DETAILED DESCRIPTION OF PREFERRED EXAMPLE EMBODIMENTS AND OF THE BEST MODE OF THE INVENTION

Figure 1:
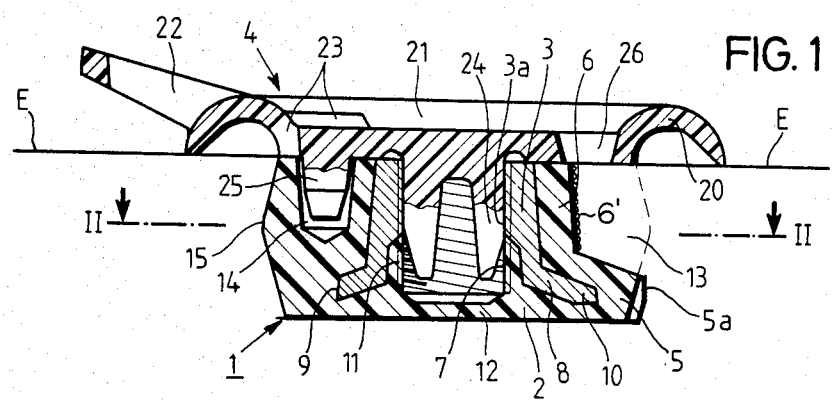
FIG. 1 is a sectional view through a mounting assembly and dowel according to the invention, whereby the sectional plane extends vertically through the central axis of the assembly.
Figure 2:
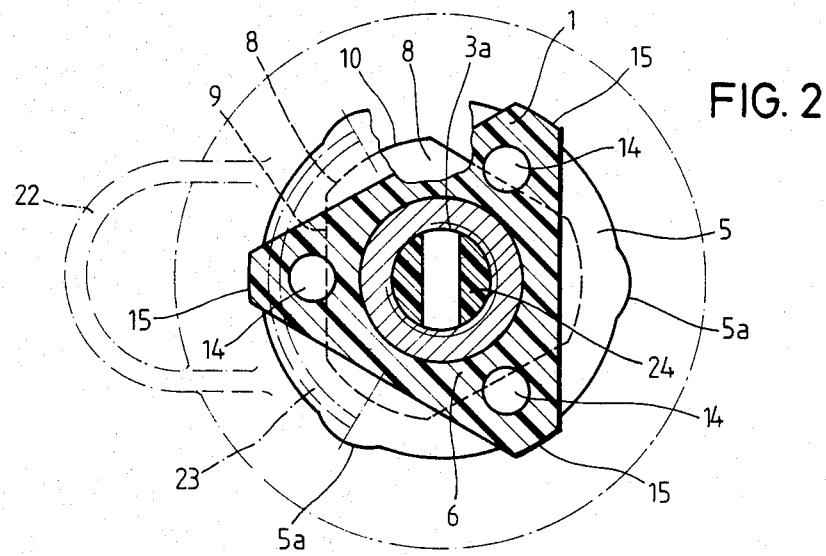
FIG. 2 is a sectional view along line II—II in FIG. 1.

Referring to FIGS. 1 and 2 the mounting assembly 1 comprises a dowel body 2 including a threaded bushing 3 and a mounting member or dish 4. The dowel body 2 is manufactured by injection molding or pressure molding and has a substantially circular flange 5 at the bottom of the dowel body 2. Three knobs 5a are uniformly distributed about the circumference of the flange 5. These knobs 5a facilitate the centering of the dowel body in the hole as will be described in more detail below.

The dowel body 2 has a cornered portion 6 on top of the flange 5. The top end of the cornered portion 6 reaches to the plane E as best seen in FIG. 1. As best seen in FIG. 2 the cornered portion 6 has a substantially triangular cross-section, thereby forming a prism-shaped body. The large sides of the prism-shaped body are uniformly distributed and of equal size. The corners 15 between two adjacent flat sides define a circle with its center in the center of the structure. The circle portions forming the corners 15 are relatively small compared to the entire circle in the circumferential direction. In the axial direction perpendicularly to the sheet of the drawing in FIG. 2, the corners 15 from three outwardly facing support surfaces in the manner of a trihedral which defines the largest diameter of the circle in the plane of the section II—II shown in FIG. 2.

The upper zone of the threaded bushing 3 is provided with a threading 3a. The lower portion of the threaded bushing 3 has a bore 7 with a diameter larger than the outer diameter of the threading 3a. A flange 8 is provided at the lower end of the bushing 3. In FIG. 2 portions of the flange 5 and of the dowel body 2 are shown broken away to make the flange 8 of the bushing 3 visible. The flange 8 is also defining a circle, but has three flattened sides 9 uniformly distributed circumferentially and interconnected by three arched portions 10.

The threaded bushing 3 is preferably manufactured of sheet metal by a pressing or deep drawing operation. As shown in FIG. 2 the flange 8 is arranged relative to the three cornered portion 6 of the dowel body 2 in such a manner that the flat sides 9 of the flange 8 face in the direction of the corners 15 of the body 6 while the arched portions 10 of the flange 8 face in the direction of the flat sides of the body 6 and also in the direction of the knobs 5a of the flange 5. The threaded bushing 3 with its flange 8 is solidly surrounded by the dowel body 2. Therefore, the bore 7 is covered with the material of the dowel body, whereby the threaded zone 11 is formed in which the outer threading diameter is necked down relative to the diameter of the threading 3a. This feature results in a self-locking screw lock. The dowel body 2 also has a bottom 12 made of the same material of the body 2, whereby the threaded hole is a dead-end hole above the bottom 12. The cornered portion 6 of the dowel body 2 comprises three dead-end holes 14.

The mounting dish 4 has a circular shape with a dish margin 20 which is hollow downwardly so that the resulting ring-shaped cavity faces the plane E. Thus, a dish-shaped depression 21 is formed around the upper end of the mounting assembly. A semicircular eyelet 22 is formed as an integral component of the mounting member or dish 4. The eyelet 22 extends away from the plane E at an angle upwardly. A slot type opening 23 extends through the inner portion of the dish margin 20 in the range of the eyelet 22. The mounting member or dish 4 has in its center a holding pin 24 facing downwardly. This holding pin 24 is pressed into the bore 7 for engagement with the threading 3a, whereby the mounting dish 4 is self-locked to the dowel body 2. As shown in FIG. 1, the holding pin 24 is slotted in its center so that upon insertion a holding force is exerted in the radial direction. The mounting dish 4 further comprises an arresting pin 25 which is aligned with one of the holes 14 and inserted therein for securing the mounting dish 4 against rotation relative to the dowel body 2.

Figure 3:
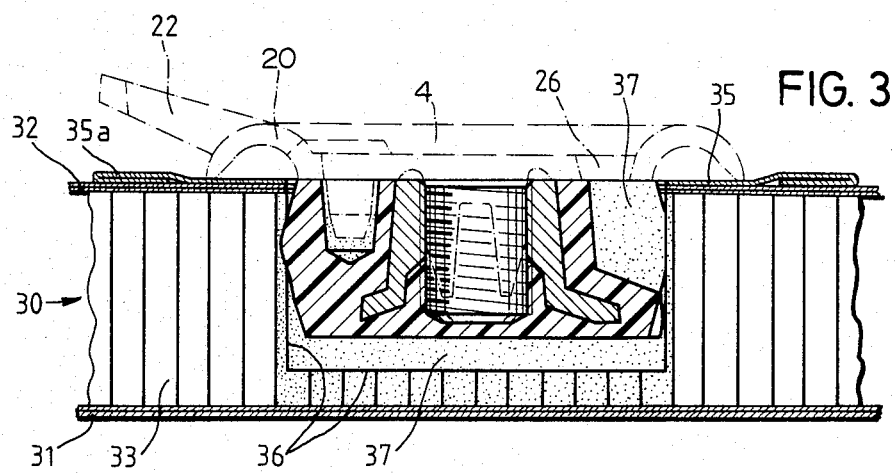
FIG. 3 is a view of the mounting assembly as shown in FIG. 1 in its mounted condition in a panel after removal of the mounting dish.

FIG. 3 illustrates the dowel body 2 after it has been installed in a compound panel 30, whereby the mounting dish 4 with its curved margin 20 is shown in dash-dotted lines. The compound panel 30 comprises a lower covering layer 31 and an upper covering layer 32 enclosing a honeycombed core 33. The dowel body 2 is installed as follows. First, a protective self-adhesive film 35 is secured to at least one surface of the panel 30. The film 35 has a non-adhesive margin 35a which may, for example, be formed by folding over a film portion so that the two adhesive surfaces stick to each other and the margin 35a itself does not stick to the surface of the protective cover sheet. Second, a hole 36 is machined into the panel, for example, by drilling or other material removal. The diameter of the hole is slightly smaller than the diameter of the circle defined by the projections or corners 15 of the dowel body. The hole 36 is deeper than the height of the dowel body 2. Third, the mounting assembly 1 is inserted together with the mounting dish 4 into the hole or bore 36 made in the preceding step. The dimension of the circle defined by the projections 15 is slightly larger than the diameter of the bore 36, thereby assuring a form-locking force transmitting seating of the dowel body 2 in the bore or hole 36. On the other hand, the knobs 5a in the flange 5 define a circle having a diameter slightly smaller than the diameter of the bore 36, thereby providing a slight play which facilitates the centering of the mounting assembly 1 in the bore 36. The outer margin 20 of the mounting dish 4 comes to rest all around on the surface of the protective film 35 in the plane E thereby assuring that the mounting assembly 1 enters into the bore 36 to a predefined mounting depth. Fourth, a castable, curable resin mass 37 is filled into the voids through the filling hole 26 in the mounting dish 4. The air which is displaced from the voids may escape into the ring channel formed by the curved dish margin 20 and from that ring channel it may pass to the atmosphere through the slot or opening 23. The casting or filling continues until the castable resin mass 37 exits through the slot 23, whereby any excess is caught in the depression 21 formed by the dish margin 20. When the casting is completed the castable resin mass 32 is permitted to harden or cure. Thereafter, the mounting dish 4 is removed by means of a hooked tool which engages the eyelet 22. As the last step the protective film 35 is removed by pulling it off the surface of the panel with the aid of the non-adhesive margin 35a. Preferably the hole 36 is made through the film 35.

FIGS. 4 to 8 illustrate another embodiment according to the invention, wherein the mounting assembly 40 has a dowel body 41 enclosing a threaded bushing 42. The dowel body 41 has essentially the same construction as the dowel body 2 according to FIGS. 1 and 2. However, in the embodiment comprising the mounting assembly 40, the dowel body 41 has in addition to its lower flange 43 an upper flange 44. As best seen in FIG. 6 the dowel body portion 45 between the two flanges 43 and 44 has again a cross-sectional shape similar to a triangle.

The threaded bushing 42 is manufactured as a pressed component or as a deep drawn component made of sheet metal. The shape of the bushing 42 corresponds with its flange 46 and its bore 47 substantially to the shape of the threaded bushing 3 according to FIG. 1. The flange 46 of the bushing 42 has again a somewhat triangular configuration as best seen in FIG. 6 where a portion of the dowel body and of the lower flange 42 are broken away to make part of the lower flange 46 of the bushing 42 visible. The flange 46 with its somewhat triangular shape is embedded into the substantially circular lower flange 43 of the dowel body 4. The lower flange 43 of the dowel body 41 is again equipped with three knobs 48 equally spaced around the circumference of the flange 43. However, it is possible to omit the knobs 48.

The upper flange 44 has a filling bore 49 and reaches with its upwardly facing surface to the plane E shown in FIG. 4. A mounting ring 50 is integrally formed with the upper flange 44 of the dowel body, whereby the interconnection between the upper flange 44 and the mounting ring 50 is provided by a ring 51 having a thin wall with a rated breaking strength, see FIG. 8. The mounting ring 50 forms with its dish margin 52 and with the plane E of the dowel 40 a filling dish 59 due to its curved shape thereby enclosing a hollow ring space between its downwardly facing surface and the plane E which may be a surface of a panel. Three slot vent openings 53 are arranged in the mounting ring 50. These openings 53 are circumferentially distributed in the ring. Further, the mounting ring 50 is provided with an eyelet 54 similar to the eyelet 22 of FIGS. 1 and 2. The eyelet 54 is integrally formed with the mounting ring 50. A protective film 55 is adhesively attached to the top surface of the flange 44 to cover the threading 56. The protective film 55 is preferably transparent. A pot-shaped insert 58 made of an elastic synthetic material and having an axial bore 57 is inserted into the bore 47 of the threaded bushing 42. This insert 58 functions as a screw lock and also closes the threaded dead end hole. The diameter of the bore 57 is smaller than the outer threading diameter. The insert 58 is held in place at its lower end by the material of the dowel body 41. In this connection it is preferable that the melting point of the material of which the dowel body is made is lower than the melting point of the material of which the insert 58 is made since the insert 58 is inserted into a mold prior to the injection molding of the dowel body. This correlation of the melting points is not necessary where the dowel body 41 is made by pressure molding. In that instance the insert 58 is pressed into the dowel body 41 subsequently to the pressure molding.

The installation of a mounting assembly 40 into a layered compound panel is performed with the same steps outlined above with reference to FIG. 3. Due to the rated reduced strength of the thin-walled ring 51 the mounting ring is easily torn off from the flange 44 by inserting a hooked removal tool into the eyelet 54. The tearing off of the mounting ring 50 is further facilitated by the slotted openings 53. FIG. 7 shows one of the slotted openings 53 in more detail. According to FIG. 8 the thin-walled portion 51 of the mounting ring 50 extends just slightly below the plane E. This feature makes sure that after removal of the mounting ring 50 it is not necessary to smooth out the portion along which the tearing took place. The protective film 55 may still be in place after the removal of the mounting ring 50 on the top surface of the dowel body 41 and may remain in that position until shortly before the time when structural components are to be mounted to the panel.

In order to improve the bonding between the dowel body 2 or 41 and the casting resin mass 37 still further, the invention contemplates that the respective surface portions of the dowel bodies are provided with a rough surface structure 6'. This may, for example, be accomplished by sandblasting the casting mold. Another way of improving the bonding is to provide the outer surfaces of the cornered portions 6 or 45 with a rifling or with grooves extending substantially axially relative to the threading 3a or 56.

Instead of the illustrated triangular cross-sectional shape of the dowel portions 6 or 45 it is possible to use other cross-sectional shapes. For example, the central dowel portion 6 or 45 could have a square or rectangular shape or it could have the cross-sectional shape of a splined shaft.

Although the invention has been described with reference to specific example embodiments, it will be appreciated, that it is intended to cover all modifications and equivalents within the scope of the appended claims.

What is claimed is:

1. A mounting assembly having a central axis, for installing a dowel in a hole in a compound panel, comprising a dowel body with a central hole, a threaded bushing rigidly held in said central hole, said dowel body having anchoring elements and at least one flange, said assembly further comprising a mounting member (4, 50) removably connected to an outer end of said dowel body, said mounting member having a curved margin (20, 52) forming a casting depression (21, 59) around the outer end of the dowel body on the surface of a panel in which the assembly is to be installed, said dowel body having a cornered portion (6, 45) arranged centrally around said central axis, said flange (5, 43) of the dowel body merging into the cornered portion, said cornered portion having relatively flattened corners (15) defining a circle having a diameter larger than the diameter of a circle defined by said flange, said threaded bushing (3, 42) also having a flange (8, 46) reaching into said flange (5, 43) of the dowel body.

2. The mounting assembly of claim 1, wherein said mounting member forms a mounting dish (4) having a holding pin (24) and an arresting pin (25), said holding pin (24) being pressed into the threaded bushing (3) for removably securing the mounting member to the dowel body, said dowel body (2) having a dead-end hole (14), said arresting pin (25) reaching into one of said dead-end holes, said mounting dish having a filling opening (26) for filling a castable resin (37) into any voids formed between the assembly and a panel into which the assembly is inserted.

3. The mounting assembly of claim 1, wherein said mounting member is constructed as a mounting ring (50), said flange of said dowel body being an upper flange (44) integrally formed with a cornered portion (45) of the dowel body (41), said mounting ring having a thin-walled ring portion (51) for removably securing said mounting ring to said upper flange (44), and wherein said upper flange (44) comprises a filling bore (49) for filling a castable resin through said bore (49).

4. The mounting assembly of claim 1, wherein said threaded bushing (3) has a threading (3a) with a lower portion (7) having a bottom (12) made of the material of the dowel body (2), and wherein a screw lock (11) is provided in said lower portion (7).

5. The mounting assembly of claim 1, wherein said curved margin of said mounting member forms a mounting dish (4) comprising a semi-circular downwardly hollow channel (20), and wherein said mounting dish further includes an eyelet (22) extending at an angle to an installation plane (E) formed by a surface of a panel, said eyelet serving for removing the mounting member from the dowel body.

6. The mounting assembly of claim 3, further comprising a pot-shaped insert (58) of elastic synthetic material inserted into an inner bore (47) of said threaded bushing (42), said insert having an inner bore (57) forming a screw lock.

7. The mounting assembly of claim 3, wherein said curved margin of said mounting member forms a mounting ring (50) comprising a semi-circular, downwardly hollow channel (20), and wherein said mounting ring (50) further includes an eyelet (54) extending at an angle to an installation plane (E) formed by a surface of a panel, said eyelet helping in the removal of the mounting ring.

8. The mounting assembly of claim 1, further comprising a protective film (35) below said curved margin and around said curved margin.

9. The mounting assembly of claim 1, further comprising roughened surface portions on the dowel body (2, 41) coming into contact with a casting resin mass (37).

* * * * *